July 22, 1952  E. A. ARP  2,604,284
ADJUSTABLE BASE FOR BORING MACHINES
Filed Oct. 27, 1947                                3 Sheets-Sheet 1
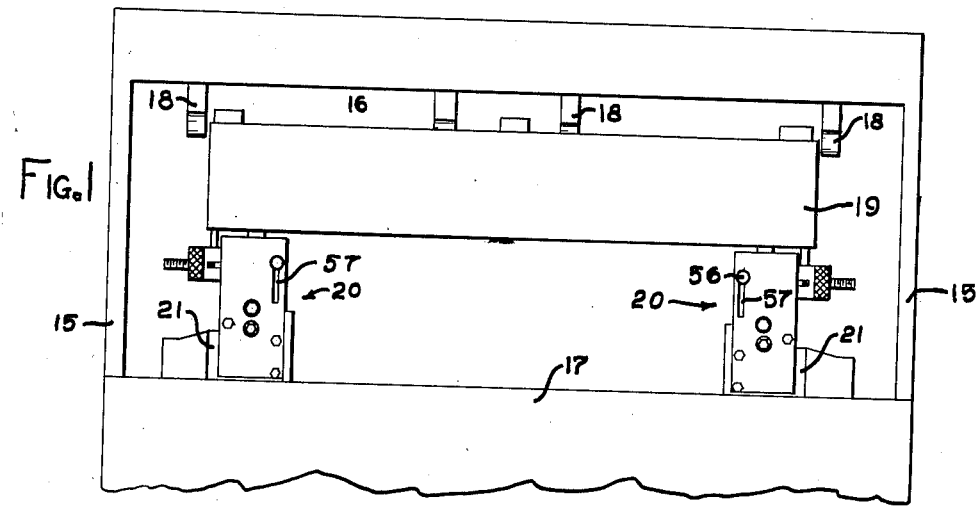
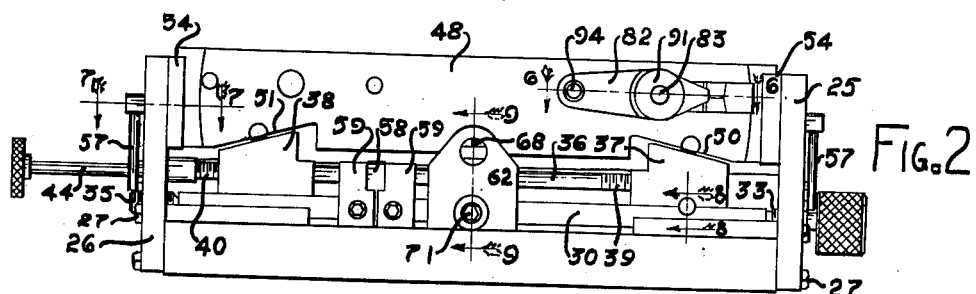
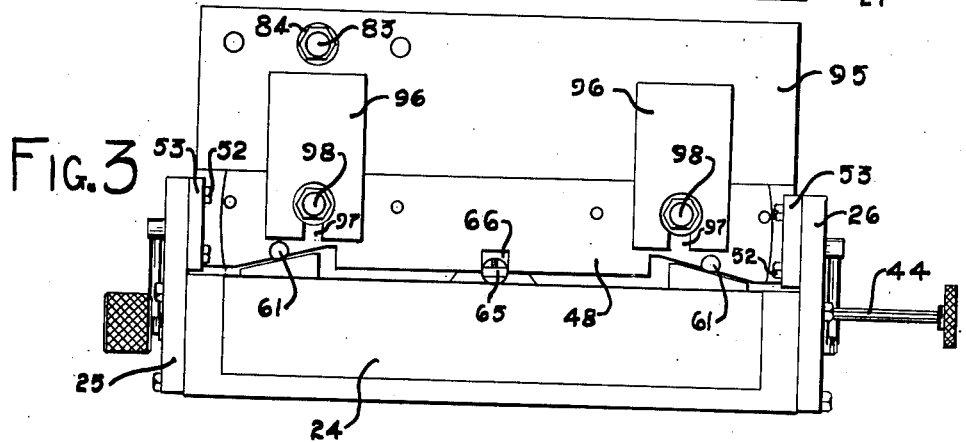
INVENTOR
EWALD A. ARP
BY G. H. Braddock
ATTORNEY

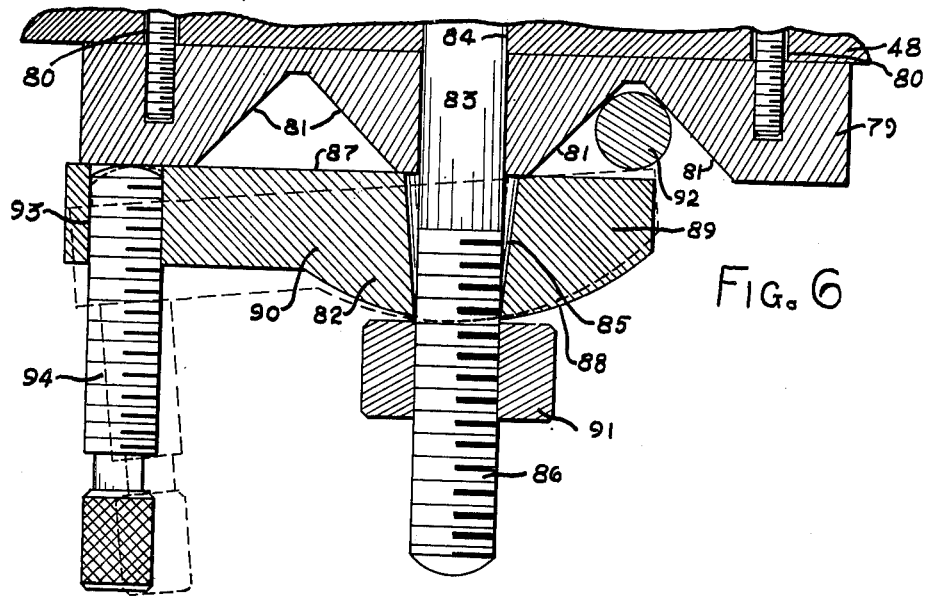
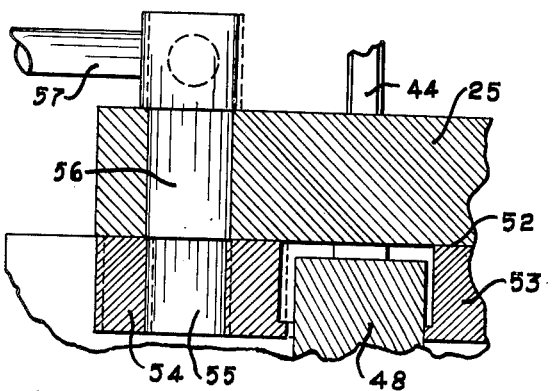
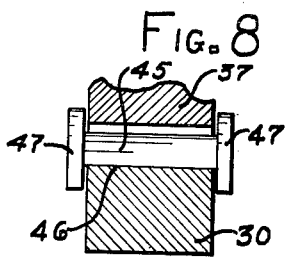
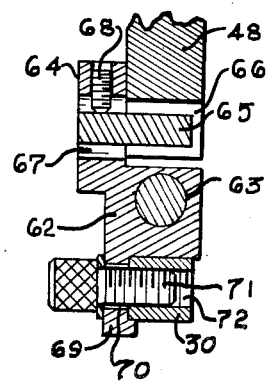

July 22, 1952 E. A. ARP 2,604,284
ADJUSTABLE BASE FOR BORING MACHINES
Filed Oct. 27, 1947 3 Sheets-Sheet 3

INVENTOR
EWALD A. ARP
BY G. H. Braddock
ATTORNEY

Patented July 22, 1952

2,604,284

UNITED STATES PATENT OFFICE 2,604,284

ADJUSTABLE BASE FOR BORING MACHINES

Ewald A. Arp, Minneapolis, Minn., assignor to Tobin-Arp Manufacturing Company, Minneapolis, Minn., a corporation of Minnesota Application October 27, 1947, Serial No. 782,321

6 Claims. (Cl. 248—23)

This invention relates to a machine useful for many different practical purposes, but which has been devised and constructed to be especially useful for boring crank shaft bearings and cam shaft bearings of internal combustion engines.

An object of the invention is to provide a machine for boring bearings, and particularly engine bearings, which will be of novel and improved construction and designed to perform its intended service in novel and improved manner.

A further object is to provide an engine bearing boring machine wherein will be incorporated various desirable and improved features and characteristics of construction novel both as individual entities of the machine and in combination with each other.

A further object is to provide a machine of the present character which will incorporate a novel and improved construction and arrangement for centering and aligning with respect to each other bearings to be bored and a boring bar with appropriate tool for operating on said bearings.

And a further object is to provide in the machine adjustable supporting units, for blocks of internal combustion engines bearings of which are to be bored or rebored, of simple, inexpensive, practical, novel and improved construction.

With the above objects in view, as well as others which will appear as the specification proceeds, the invention comprises the construction, arrangement and combination of parts as now to be fully described and as hereinafter to be specifically claimed, it being understood that the disclosure herein is merely illustrative and intended in no way in a limiting sense, changes in details of construction and arrangement of parts being permissible as long as within the spirit of the invention and the scope of the claims which follow.

In the accompanying drawings forming a part of this specification:

Fig. 1 is an elevational view, partially broken away, of a boring machine in which the features and characteristics of the invention are incorporated;

Fig. 2 is an enlarged side elevational view of one of a pair of substantially duplicate, adjustable engine block supporting units which the boring machine includes;

Fig. 3 is a side elevational view of the unit of Fig. 2, showing the side of said unit opposite that disclosed in said Fig. 2, and additionally disclosing an auxiliary element adapted selectively to be employed as a part of the unit;

Fig. 6 is a detail sectional view, taken substantially on line 6—6 in Fig. 2;

Fig. 7 is a detail sectional view, taken substantially on line 7—7 in Fig. 2;

Fig. 8 is a detail sectional view, taken substantially on line 8—8 in Fig. 2; and Fig. 9 is a detail sectional view, taken substantially on line 9—9 in Fig. 2.

Figure 4:
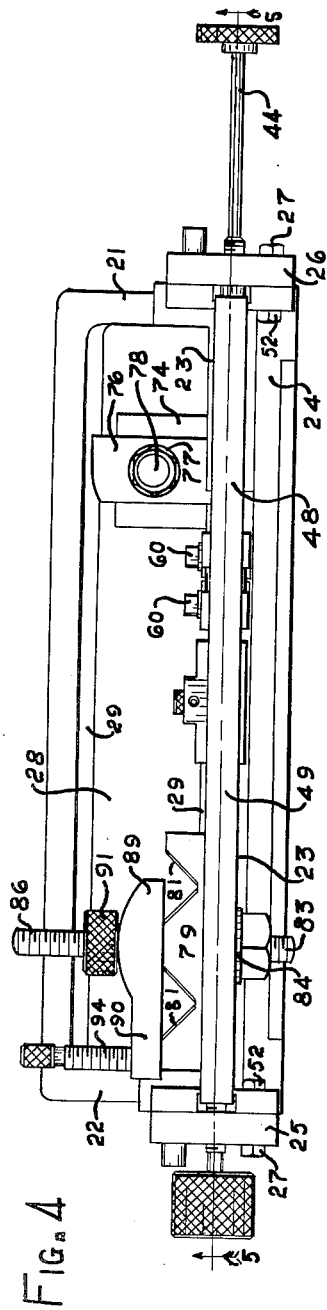
Fig. 4 is an enlarged plan view of the unit of Fig. 3, the auxiliary element being omitted.

With respect to the drawings and the numerals of reference thereon, the main frame of the machine includes spaced apart uprights, denoted 15, 15, integral or rigid at their upper ends with a horizontally disposed, upper frame member 16 and secured at their lower ends to a horizontally disposed, lower frame member 17. The spaced apart uprights 15, 15 are in perpendicular relation to the upper and lower frame members 16 and 17, the upper surface of said lower frame member is in a single horizontal plane, and the lower frame member can be adjustable toward and away from said upper frame member.

A plurality of locating units, or boring bar supports, four as disclosed, and each denoted 18, are employed in the accomplishment of the centering and/or alining and/or positioning relative to each other of a boring bar (not shown) and bearings to be operated upon by reference to supporting elements (not shown) upon the upper frame member 16 for said locating units, or boring bar supports, 18. The locating units, or boring bar supports, can be duplicates. They can be suitably and conveniently fixedly or adjustably supported upon said upper frame member 16 within the principles of the present invention. The locating units, or boring bar supports, employed will include bearings in alined relation in a horizontal plane extending longitudinally of the machine when said locating units, or boring bar supports, are set to be capable of receiving a boring bar. Said bearings which the locating units, or boring bar supports, include of course are for the purpose of cooperatively receiving and guiding the boring bar during a boring operation upon a bearing. In practice, there will be one of said locating units, or boring bar supports, situated at each of opposite sides of a bearing to be bored during the boring operation, and said bearing to be bored will be centered and/or alined relative to the locating units, or boring bar supports, in a manner hereinafter to be described.

In Fig. 1 of the drawings, an engine block 19 is disclosed with a bearing or bearings of the block properly centered between bearings of different locating units, or boring bar supports, 18 in position to be bored or rebored.

The horizontal upper surface of the lower frame member 17 provides a main supporting means for an engine block, such as 19, bearings of which are to be bored. As disclosed in Fig. 1, said upper horizontal surface of said lower frame member is adapted to support a pair of spaced apart, adjustable supporting units, each represented 20, for the engine block which extend transversely of the lower frame member 17 and are adapted to be slidably adjustable forwardly and rearwardly and longitudinally of the machine. The adjustable supporting units 20 may be substantially duplicates, the one of the other, but, desirably, one will be right and the other left.

Each adjustable supporting unit 20 includes a body member or base 21 which conveniently can be constituted as cast iron. Each body member or base 21 includes a horizontal portion 22 having a flat lower surface adapted to be rested on the horizontal upper surface of the lower frame member 17, and also includes spaced apart, upwardly facing, open ended, longitudinally alined guideways 23, 23 which are situated at the opposite ends of the body member or base adjacent an upstanding, longitudinally extending rear wall 24 of said body member or base integral with the horizontal portion 22. Additionally, each adjustable supporting unit 20 includes spaced apart, oppositely disposed, parallel, upstanding end walls, represented 25 and 26, respectively, secured, as at 27, up against the opposite ends of the corresponding body member or base 21 adjacent its rearward side. The lower ends of the end walls 25 and 26 terminate at locations above the flat lower surface of the corresponding horizontal portion 22, and the upper ends of said end walls 25 and 26 terminate at locations above the upper end of the corresponding upstanding rear wall 24. In the disclosure as made, the upper end of said rear wall 24 terminates at about the mid-lengths of the end walls 25 and 26, and said end walls are of equal length. A forward part of the horizontal portion 22 of each body member or base 21 is cut away to provide a longitudinally extending slot 28 through said horizontal portion and parallel, upwardly facing, longitudinally extending surfaces 29, 29 at the opposite sides of said longitudinally extending slot, for a purpose to be set forth.

The longitudinally extending guideways 23, 23 are disposed rearwardly and upwardly of the longitudinally extending slot 28, adjacent the horizontal portion 22, and slidably receive a longitudinally extending, horizontal adjustment bar 30 in such manner that said adjustment bar rests, as indicated at 31, on upper surfaces of said horizontal portion 22 to be longitudinally slidable thereover. The length of the horizontal adjustment bar 30 is less than a measurement representing the distance between the end walls 25 and 26, and, in the disclosed embodiment of the invention, said adjustment bar is of rectilinear configuration. The horizontal adjustment bar 30, while mounted for free sliding movement in longitudinal direction, is retained in the guideways 23, 23 against the possibility of transverse movement.

The end wall 25 of each adjustable supporting unit includes a threaded opening 32 which receives an adjusting screw 33 adapted to be engaged against the adjacent end of the horizontal adjustment bar 30, and the end wall 26 of each adjustable supporting unit includes a threaded opening 34 which receives an adjusting screw 35 adapted to be engaged against the end of said horizontal adjustment bar 30 opposite the adjusting screw 33. Obviously, the horizontal adjustment bar 30 can be adjusted longitudinally of the body member or base 21 of the corresponding unit 20 and fixed at any position which may be predetermined by relative adjustment of said adjusting screws 33 and 35. The adjusting screw 35 is adapted to be manipulated in any suitable and convenient manner, as by an adjusting tool 44. Said horizontal adjustment bar of course will be fixed against longitudinal movement when its opposite ends are engaged by the interior ends of the adjusting screws 33 and 35.

A horizontal adjusting rod 36 of each adjustable supporting unit 20 supports actuating cams, denoted 37 and 38, respectively, in such manner that said actuating cams can be moved toward and away from each other. Said actuating rod 36 includes threaded portions, one right and the other left, represented 39 and 40, respectively, upon its opposite end portions, and the actuating cams 37 and 38 include internal threads ridable on said oppositely disposed threaded portions 39 and 40. The actuating rod 36 and said actuating cams 37 and 38 are situated vertically above and in parallel relation to the horizontal adjustment bar 30 of the corresponding unit 20 adjacent the corresponding body member or base 21, and lower surfaces of the actuating cams are engaged against and longitudinally slidable over the upper surface of said horizontal adjustment bar. The outer end of the threaded portion 40 is fixedly secured to an anchoring element 41 for the adjusting rod 36, and said anchoring element is rotatably and slidably supported in an opening 42 in the end wall 26. An angular slot 43 in the outer end of the anchoring element 41 is for receiving an adjustment tool such as 44. Engagement of the anchoring element 41 with the defining wall of the opening 42 causes the threaded portion 40 of the adjusting rod 36 and the actuating cam 38 thereon to be retained against transverse movement. An instrumentality for precluding transverse movement of the threaded portion 39 of said adjusting rod and the actuating cam 37 thereon is constituted as a retainer including a reduced portion 45 situated in a transverse slot 46 in the upper surface of an end portion of the adjustment bar 30 and head members 47, 47 on said reduced portion arranged at opposite sides of said actuating cam 37 and said adjustment bar. Stated differently, the reduced portion 45 of the retainer is within the transverse slot 46 below the upper surface of the adjustment bar 30, and the heads 47, 47 of said retainer include portions at the opposite sides of and in adjacent relation to the actuating cam 37, as well as at the opposite sides of and in adjacent relation to said adjustment bar. As disclosed, the adjustment bar 30 and the actuating cams 37 and 38 are all substantially of equal width.

Each adjustable supporting unit 20 includes a leveling member 48, and an engine block, such as 19, the bearings of which are to be bored or rebored, is adapted to be supported by the leveling members of different units 20. Each leveling member 48 extends longitudinally of the corresponding body member or base 21 and is constituted as a flat plate of oblong, rectilinear configuration in the disclosure as made. The upper edge of each leveling member or flat plate 48 is constituted as a flat surface 49 arranged in a single substantially horizontal plane above the elevation of the upper ends of the end walls 25 and 26 of the corresponding unit 20, and opposite end portions of the lower marginal edge of each leveling member or flat plate are cut away to provide downwardly facing cam surfaces, indicated 50 and 51, respectively, adapted to rest upon and be slidable over upwardly facing camming surfaces of the actuating cams 37 and 38. Each of the camming surfaces slants downwardly and outwardly, and all of said camming surfaces are at the same angle to the horizontal. Slide shoes supported by each leveling member or flat plate 48, situated at engaging cam surfaces, are indicated 61.

The thickness of each leveling member or flat plate 48 is substantially equal to the width of each of the actuating cams 37 and 38 in the disclosure as made, said actuating cams are of equal width, the width of each leveling member or flat plate is disposed in a plane perpendicular to the horizontal portion 22 and also perpendicular to the end walls 25 and 26, and the opposite end portions of each leveling member or flat plate are slidably supported, in vertical alinement with the actuating cams 37 and 38, between said end walls for up and down vertical movement and for limited rocking movement in a vertical plane.

Figure 5:
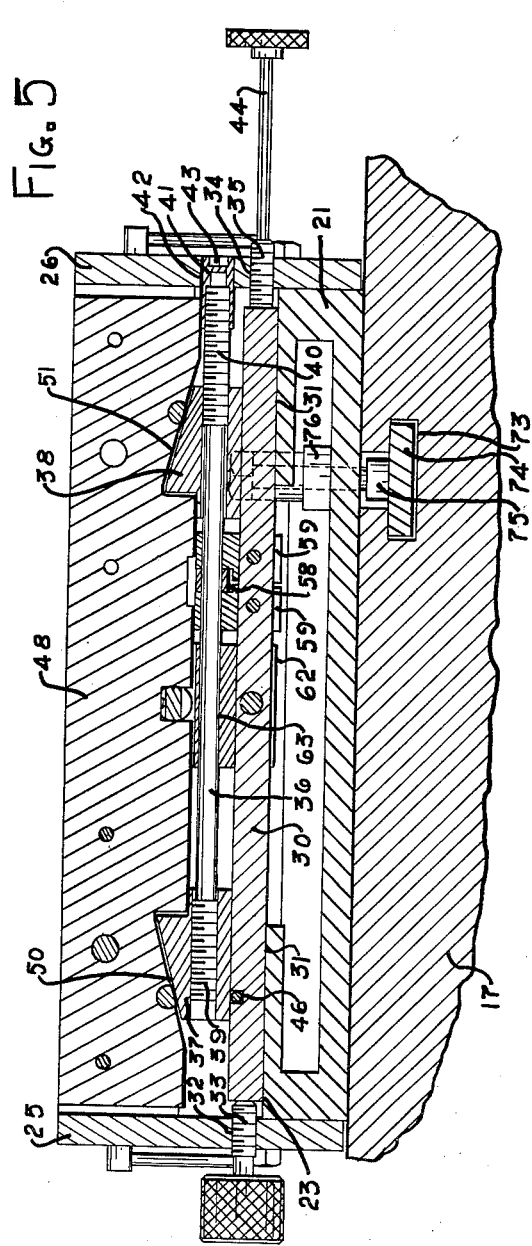
Fig. 5 is a detail sectional view, taken substantially on line 5—5 in Fig. 4.

Each of the end walls 25 and 26 fixedly supports, as at 52, a vertical guide block 53 situated interiorly of the corresponding end wall and also movably supports a vertical guide block 54 situated interiorly of the corresponding end wall and arranged adjacent the fixed guide block 53, and the opposite end portions of the leveling member or flat plate 48 of the corresponding unit 20 are adapted to be situated between guide blocks 53, 54 and 53, 54 upon said end walls 25 and 26. Each leveling member or flat plate, while of length so that its opposite end portions can be situated between oppositely disposed guide blocks, has length less than a measurement representing the distance between the end walls 25 and 26 of the corresponding unit 20. See Figs. 2, 3, 4, 5 and 7. Each movable guide block 54 is supported upon an eccentric 55 rotatably mounted substantially in the midlength of the movable guide block and integral or rigid with a stud 56 rotatably mounted in the corresponding end wall, 25 or 26, as the case may be. A manipulating handle for each stud 56 is denoted 57. The construction and arrangement are such that clamping jaws of the guide blocks 53 and 54 can be engaged against opposite surfaces of the end portions of the leveling members or flat plates 48, or can be released from said leveling members or flat plates, in response to rotative movement of the manipulating handles 57. Instead of providing each of the end walls 25 and 26 of a unit with a fixed and a movable guide block, one of the end walls can support a pair of suitably spaced, fixed guide blocks while the opposite end wall includes both a fixed and a movable guide block. Desirably, adjustments of the leveling members or flat plates will be made, in a manner to be explained, while said leveling members or flat plates are free for sliding movement relative to the guide blocks, and the guide blocks will be caused to become clamped against the opposite end portions of the leveling members or flat plates after adjustments are completed. The stock from which the leveling members or flat plates 48 are constructed might in some instances be warped in longitudinal direction. The provision of relatively adjustable guide blocks for at least one end portion of each leveling member or flat plate is provision for use of leveling members or flat plates which may be warped in lengthwise direction and eliminates the necessity of truing up of the leveling members or flat plates. The essential requirement of each leveling member or flat plate is that its upper surface 49 be arranged in a single plane.

Each adjustable supporting unit 20 incorporates a construction and arrangement for fastening the horizontal adjusting rod 36 to the horizontal adjustment bar 30 both to insure longitudinal movement of said adjusting rod and adjustment bar together as a unit when the adjustment bar is longitudinally adjusted and to permit rotative movement of the adjusting rod. A thrust collar fixed on an intermediate portion of the horizontal adjusting rod 36 is represented 58, and thrust blocks upon said adjusting rod, at the opposite sides of and in contiguous relation to said thrust collar, are designated 59, 59. Each of the thrust blocks 59 rotatably receives the adjusting rod, and said thrust blocks are rigidly secured, as at 60, to the horizontal adjustment bar 30. It will be evident that the adjusting rod and adjustment bar are fixed against relative longitudinal movement, and that said adjusting rod will be fixed against lengthwise movement in the corresponding unit 20 when the adjustment bar 30 is fixed in stationary position by the adjusting screws 33 and 35. Also it will be evident that the adjusting rod will be moved longitudinally with the adjustment bar when the latter is longitudinally adjusted.

Each adjustable supporting unit 20 also incorporates a construction and arrangement for centering the corresponding leveling member or flat plate 48. A locating block 62, substantially at the midlength of the corresponding horizontal adjustment bar 30, rotatably and slidably receives, as at 63, the corresponding horizontal adjusting rod 36 and is adapted to be adjustably secured to the corresponding horizontal adjustment bar 30. An upwardly projecting ear 64, on an upper portion of the locating block 62 and at the forward side of the leveling member or flat plate 48 of the corresponding unit 20, rigidly supports a rearwardly extending lug 65 disposed within a downwardly facing, rectilinear slot 66 in the lower edge of said leveling member or flat plate. Each lug 65 is fixed in an opening 67 in the corresponding ear 64 by a set screw 68, and is disposed in the corresponding rectilinear slot 66 in such manner as to substantially span the distance between its side walls. The lugs 65 are more or less loosely arranged in the rectilinear slots 66 in such manner that the leveling members or flat plates 48 can be adjusted vertically relative to said lugs and rocked about the lugs in a vertical plane while the lugs remain in said rectilinear slots. A downwardly projecting ear 69, on a lower portion of said locating block 62 and at the forward side of the horizontal adjustment bar 30 of the corresponding unit 20, includes an elongated slot 70 disposed longitudinally of said adjustment bar for freely receiving a locking screw bolt 71 adapted to be turned down in a transverse threaded opening 72 in the adjustment bar. In practical operation, the locating blocks 62 will be adjusted along the elongated slots 70, after the adjustment bars 30 have been adjusted to their intended positions, to cause the lugs 65 to center the leveling members or flat plates 48, and when said leveling members or flat plates are centered, the locking screw bolts 71 will be turned home in the threaded openings 72 thus to cause the leveling members or flat plates to be fixed against longitudinal movement.

Each adjustable supporting unit 20 is adapted to be releasably clamped down on the lower frame member 17, or equivalent support, at any position which may be preferred. As shown, the lower frame member 17 includes an internal, longitudinally extending T-slot 73 adapted to slidably receive a first clamp member 74 for each unit 20 having an internally threaded upwardly extending portion 75. A second clamp member 76 for each unit 20 includes opposite end portions adapted to be removably rested on the upwardly facing surfaces 29, 29 at opposite sides of the longitudinally extending slot 28 in the corresponding body member or base 21 and an upwardly extending spacer 77 arranged centrally of said second clamp member. A central opening through each second clamp member and its spacer is for receiving a clamping screw bolt 78 adapted to be turned down into the internally threaded upwardly extending portion 75 of the first clamp member 74 of the corresponding unit 20 with its head against the upper end of the spacer 77 of the second clamp member 76 of said corresponding unit 20 thus to cause said first clamp member to be forced up against internal surfaces of the lower frame member 17 and said second clamp member to be forced down against said surfaces 29, 29. It will be apparent that the construction and arrangement as illustrated and described is provision for situating and clamping down the adjustable supporting units 20 at any location on the lower frame member 17 which may be predetermined.

Each adjustable supporting unit 20 includes instrumentalities for releasably clamping an engine block, such as 19, having bearings to be bored or rebored, down against its leveling member or flat plate 48 when the engine block is supported upon a pair of adjustable supporting units. Speaking generally, an engine block is fastened down upon the units 20, 20 through the instrumentality of leverage clamps, one for each unit, adapted to be engaged against downwardly projecting studs of the engine block. More explicitly, a first anchor member 79 is adapted to be releasably secured, as at 80, against a side surface of an upper portion of each leveling member or flat plate 48 in such manner that said first anchor member will be situated below the upper edge of said leveling member or flat plate substantially in a horizontal plane. An outer portion of each first anchor member 79, opposite a leveling member or flat plate to which the first anchor member is secured, includes spaced apart cut-away parts adjacent its opposite ends each bounded or defined by clamping surfaces 81, 81 set at angular relation to each other and extending transversely across the corresponding first anchor member. A second anchor member 82 is adapted to be supported upon each leveling member or flat plate 48, adjacent a first anchor member 79 which the leveling member or flat plate supports, for movement relative to said first anchor member. A stud bolt 83 for supporting each second anchor member 82 includes an inner end portion adapted to be secured, as at 84, in the corresponding leveling member or flat plate, an intermediate portion which passes freely through an opening in the corresponding first anchor member and through an opening 85 in the corresponding second anchor member, and a threaded outer end portion 86. The stud bolts 83 are arranged in perpendicular relation to the leveling members or flat plates. The opening 85 in each second anchor member 82 is contiguous at its opposite ends with a flat inner surface 87 and a curvilinear outer surface 88 of the second anchor member, and the openings 85 are of conical shape. They taper in outward direction from the flat inner surface 87. A short arm 89 of each second anchor member 82 is situated at one side of the corresponding stud bolt 83, a long arm 90 of each second anchor member is situated at the opposite side of said corresponding stud bolt, and each second anchor member is adapted to be held upon its corresponding stud bolt in proximate relation to the corresponding first anchor member 79 by a retaining nut 91 on the threaded outer end portion 86 situated in contiguous relation to the curvilinear outer surface 88. The short arm 89 of each second anchor member constitutes a clamping jaw of the second anchor member adapted to be engaged against a downwardly projecting stud 92 of a supported engine block to cause said downwardly projecting stud to be grasped between the end portion of the flat inner surface 87 at the inner side of said short arm 89 and the clamping surfaces 81, 81. The long arm 90 of each second anchor member includes a threaded opening 93 in its outer end portion for receiving a clamping screw bolt 94 adapted to be turned up against an adjacent surface of the corresponding first anchor member 79 thus to cause the second anchor member to be rocked upon the corresponding stud bolt 83 as an axis and the clamping jaw 89 and clamping surfaces 81, 81 to grip a downwardly projecting stud such as 92. In Fig. 6 of the drawings, the leverage clamp is disclosed in full lines as when the downwardly projecting stud 92 is freely situated in a cut-away portion of the first anchor member and in dotted lines as when said downwardly projecting stud is grasped between said clamping jaw 89 and clamping surfaces 81, 81.

The adjustable supporting units 20 may additionally include auxiliary elements, each constituted as a flat plate 95, for supporting an engine block, such as 19, at higher elevation relative to the body members or bases 21 than said engine block would be supported were the auxiliary elements or flat plates 95 not employed. Each auxiliary element or flat plate 95 is of rectilinear configuration and includes a flat lower surface adapted to be rested squarely upon the flat upper surface of a leveling member or flat plate 48 and a flat upper surface parallel with its flat lower surface. Each auxiliary element or flat plate 95 is adapted to be detachably secured to a leveling member or flat plate 48. As disclosed, spaced apart, vertical supporting pieces 96, rigidly secured to a lower portion of a side surface of each auxiliary element or flat plate 95 and extending downwardly therefrom, include vertical slots 97 in their lower end portions for receiving screw bolts 98 adapted to be turned down into openings in the corresponding leveling member or flat plate 48 thus to secure each auxiliary element or flat plate 95 to a leveling member or flat plate 48 by which supported. Evidently, the auxiliary elements 95 when secured in place constitute upward extensions of the leveling members 48. When employed, said auxiliary elements 95 will themselves support leverage clamps, for downwardly projecting studs, such as 92, of a supported engine block, which may be substantially of the construction as hereinbefore set forth. Auxiliary elements such as 95 are adapted to serve two main purposes. A first main purpose is to cause an engine block to be supported at elevation where its bearings to be bored or rebored will be alined with the boring tool in any instance where the leveling members 48 alone would be at elevation too low to accomplish alinement of the engine block bearings and boring tool, and a second main purpose is to provide distance between the engine block supporting surface of each adjustable supporting unit 20 and its body member or base 21 sufficient to insure that the lower ends of downwardly projecting studs such as 92 will be above and in clearing relation to said body member or base.

In the instance of each of the units 20, the construction and arrangement are such that when the horizontal adjusting rod 36 is rotated, the actuating cams 37 and 38 are moved inwardly or outwardly, as the case may be, upon said actuating rod. Clearly, rotation of said actuating cams 37 and 38 will be precluded by engagement of the flat lower surfaces of the actuating cams with the flat upper surfaces of the horizontal adjustment bar 30 and of the camming surfaces of said actuating cams with the camming surfaces 50 and 51 of the leveling members 48. When the actuating cams 37 and 38 of each unit 20 are moved away from each other, the camming surfaces of the actuating cams 37 and 38 will cause the camming surfaces 50 and 51, and hence the corresponding leveling member 48, to be elevated, and when said actuating cams 37 and 38 are moved toward each other, the camming surfaces of said actuating cams will permit said camming surfaces 50 and 51, and hence said corresponding leveling member, to be lowered. When each leveling member 48 is elevated or lowered its opposite end portions evidently will be moved to the same degree so that the plane of the upper supporting edge of the leveling member will remain at fixed angle to the plane of the supporting surface of the lower frame member 17 during elevation or lowering of said leveling member. Plainly, longitudinal adjustment of the horizontal adjustment bar 30 of either unit 20 will cause both of the actuating cams 37 and 38 to be moved together as a unit longitudinally of the corresponding body member or base 21 with resultant tilting in a vertical plane of the corresponding leveling member 48. That is, the camming surfaces of the actuating cams 37 and 38 will be slid in a single direction along the camming surfaces 50 and 51 in response to longitudinal adjustment of the horizontal adjustment bar 30 and cause the corresponding leveling member to be tilted in a vertical plane thus to cause the angle of the plane of the upper supporting edge or surface of said corresponding leveling member relative to the plane of the supporting surface of said lower frame member 17 to be altered. Evidently, each leveling member 48 can be oscillated for a slight distance about the corresponding lug 65 as an axis and relative to the supporting surface of the lower frame member 17. Thus each leveling member is adjustable to be tilted vertically and endwise transversely of the machine. Supposing an engine block, such as 19, having bearings to be bored or rebored, when placed upon the spaced apart leveling members, or upon auxiliary elements such as 95, do not rest squarely upon said leveling members, or auxiliary elements, all that is necessary to cause said engine block to rest solidly on the leveling members, or auxiliary elements, is to longitudinally adjust the horizontal adjustment bar 30 of one or the other of the units 20 to cause the corresponding leveling member to be oscillated upon the corresponding lug 65 to a position where the engine block will rest squarely and there fastened by the adjusting screws 33 and 35. The locking screw bolts 71 will be rotated to the released condition of the locating blocks 62 before the horizontal adjustment bars 30 are longitudinally adjusted so that movement of said adjustment bars will not cause the leveling members 48 to become uncentered. Should a leveling member become uncentered, it can be easily manually adjusted to centered position. After longitudinal adjustment of a horizontal adjustment bar 30, the corresponding locking screw bolt 71 is turned home, with the corresponding leveling member 48 in centered position, to fix said corresponding leveling member against the possibility of longitudinal movement. The units 20 are capable of adjustment to support an engine block so that its lower, resting surface is in a horizontal plane, or in a plane tilted to the horizontal to extent or degree suitable to a particular boring operation to be accomplished.

What is claimed is:

1. In a machine of the character described, a supporting unit comprising a body member to be rested upon a surface, an adjustment bar mounted upon said body member for movement longitudinally thereof, means for fastening said adjustment bar in fixed relation to said body member, means for accomplishing adjustment of said bar longitudinally of the body member, an adjusting rod rotatably mounted upon said body member including externally threaded end portions one right and the other left, means securing the adjusting rod and adjustment bar to each other for longitudinal movement of said adjusting rod in response to longitudinal adjustment of said bar, means for accomplishing rotation of said adjusting rod, spaced apart actuating cams including internally threaded openings upon said externally threaded end portions, respectively, of the adjusting rod movable with said adjusting rod as a unit in response to longitudinal adjustment of said bar, said actuating cams being movable toward each other in response to rotation of the adjusting rod in one direction and away from each other in response to rotation of said adjusting rod in opposite direction, a leveling member having camming surfaces supported upon camming surfaces of said actuating cams, and means for fixing said leveling member against longitudinal movement and affording the leveling member freedom for oscillating movement and movement toward and away from the adjustment bar.

2. The combination as specified in claim 1 wherein said actuating cams are engaged against and slidable over said adjustment bar.

3. The combination as specified in claim 1 wherein said leveling member fixing means is constituted as a locating block rotatably and slidably receiving said adjustment rod and adjustable longitudinally of said adjustment bar, and a lug rigid with said locating block and situated in a rectilinear slot in said leveling member.

4. In a machine of the character described, a supporting unit comprising a body member to be rested upon a surface, oppositely disposed, upstanding end walls rigid with said body member, an adjustment bar between the end walls supported for movement longitudinally of the body member, means for fastening said adjustment bar in fixed relation to said body member, means for accomplishing adjustment of said bar longitudinally of the body member, a rotatably mounted adjusting rod between said end walls including externally threaded end portions one right and the other left, means securing the adjusting rod and adjustment bar to each other for longitudinal movement of said adjusting rod in response to longitudinal adjustment of said bar, means for accomplishing rotation of said adjusting rod, spaced apart actuating cams including internally threaded openings upon said externally threaded end portions, respectively, of the adjusting rod movable with said adjusting rod as a unit in response to longitudinal adjustment of said bar, said actuating cams being movable toward each other in response to rotation of the adjusting rod in one direction and away from each other in response to rotation of said adjusting rod in opposite direction, a leveling member between and extending to position above said end walls having camming surfaces supported upon camming surfaces of said actuating cams, means for fixing said leveling member against longitudinal movement relative to said adjustment bar and in spaced relation to said end walls and affording the leveling member freedom for oscillating movement and movement away from and toward the adjustment bar, and means for fastening the leveling member in fixed relation to said end walls.

5. The combination as specified in claim 4 wherein said actuating cams are engaged against and slidable over said adjustment bar.

6. In a supporting unit of the character described, a body member, an adjustment bar guidably supported upon said body member for movement longitudinally thereof, means for fastening said adjustment bar in fixed relation to said body member, means for accomplishing adjustment of said bar longitudinally of the body member, a wall rigid with said body member in adjacent relation to an end of said adjustment bar, an adjusting rod parallel with said adjustment bar and having an end portion thereof rotatably and slidably supported in said wall, said adjusting rod including externally threaded end portions one of which is right and the other of which is left and one of which is adjacent and the other of which is spaced from said wall, actuating cams slidably engaged against said adjustment bar and including internally threaded openings ridable upon said externally threaded end portions, respectively, of said adjusting rod, means for accomplishing rotation of said adjusting rod, and a retainer for precluding transverse movement of the externally threaded end portion of said adjusting rod spaced from said wall and the actuating cam thereon relative to said adjustment bar.

EWALD A. ARP.

REFERENCES CITED

The following references are of record in the file of this patent:

UNITED STATES PATENTS

| Number | Name | Date |
|---|---|---|
| 16,841 | Jarboe | Mar. 17, 1857 |
| 858,430 | Wheeler | July 2, 1907 |
| 1,649,876 | Walsh | Nov. 22, 1927 |

FOREIGN PATENTS

| Number | Country | Date |
|---|---|---|
| 28,530 | Great Britain | Dec. 19, 1911 |